(12) United States Patent
Veronesi et al.

(10) Patent No.: US 6,358,000 B1
(45) Date of Patent: Mar. 19, 2002

(54) METHOD OF REPAIRING A REACTOR COOLANT PUMP SHAFT AND A REACTOR COOLANT PUMP REPAIRED BY SUCH METHOD

(75) Inventors: Luciano Veronesi; James A. Drake, both of Pittsburgh, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/587,763

(22) Filed: Jun. 6, 2000

(51) Int. Cl.⁷ .............................................. F01D 25/26
(52) U.S. Cl. .................................. 415/134; 29/888.021
(58) Field of Search .............................. 415/134, 216.1; 29/890.031, 888.021

(56) References Cited

U.S. PATENT DOCUMENTS 4,793,043 A * 12/1988 Mathews et al. ...... 29/888.021
5,295,300 A * 3/1994 Garrick, Jr. ............ 29/888.021

* cited by examiner

Primary Examiner—Edward K. Look
Assistant Examiner—Igor Kershteyn

(57) ABSTRACT

Cracks in the shaft of a reactor coolant pump adjacent a tapered end on which the impeller is mounted are removed by machining a circumferential groove in the pump shaft to a depth and an axial length which removes the cracks but does not extend into the tapered end of the pump shaft. A split ring fills the groove to an outer diameter which matches the outer diameter of the pump shaft. A thermal sleeve shrink fit over the split ring has internal annular ribs engaging the shaft and the ring to form an annulus which communicates with the pump chamber sufficiently to maintain a layer of substantially stagnant coolant over the split ring and the pump shaft at the pressure of the coolant being pumped. An oversized washer between the impeller and the impeller retainer nut overlaps the interface between the impeller and the tapered end of the pump shaft to impede the flow of hot reactor coolant along the keyways in the tapered end of the shaft and the impeller to minimize temperature fluctuations in the vicinity of the thermal sleeve. Preferably, the thermal sleeve has a lower coefficient of thermal expansion than those of the shaft and the split ring.

19 Claims, 3 Drawing Sheets

METHOD OF REPAIRING A REACTOR COOLANT PUMP SHAFT AND A REACTOR COOLANT PUMP REPAIRED BY SUCH METHOD

BACKGROUND OF THE INVENTION

1. Field of the Invention

This invention relates to a method of repairing cracks in the shaft of a pump for hot liquids, such as a reactor coolant pump, and a pump which has been so repaired.

2. Background Information

Pumps which circulate hot liquids such as the reactor coolant pumps in a pressurized water reactor (PWR) are subjected to harsh conditions. For instance, in the PWR, the reactor coolant water is at a temperature in excess of 500° F. and a pressure of about 2250 psi. Cracking was observed in the shafts of pressurized water reactor coolant pumps early in their service life. These cracks were located in the labyrinth region where the shaft penetrates a thermal barrier and were attributed to thermal cycling from the improper mixing of cooler water within the thermal barrier with the hotter primary water in the pump casing. To address this problem, the shaft was fitted with a stainless steel thermal sleeve installed with a light interference fit.

It has been observed that this thermal sleeve has not been effective in preventing shaft cracking. Cracking has also been found on the thermal sleeve and in the labyrinths. Extensive evaluations have shown that under operating conditions a gap opens between the lower end of the sleeve and the shaft due to differential thermal expansion. This in turn has caused thermal oscillations in the sleeve-shaft annulus. These thermal oscillations are aggravated by bypass flow down the openings between the shaft/impeller key and keyway due to the large pressure differential between the top of the impeller and the bottom. The resulting cyclic thermal stresses, in combination with residual tensile stresses in the shaft from initial machining operations, has lead to thermal fatigue cracking in the shaft, thermal sleeve and adjacent labyrinths. Cracks up to about 0.2 inch depth have been measured to date in the shaft and labyrinths, while through-wall cracks have been seen in the thermal sleeve in some instances. The current approach to addressing the cracking problem is to either replace the pump shaft completely, a very expensive solution, or to machine the lower portion of the shaft diameter by turning on a lathe to remove existing cracks and to install a new stainless steel sleeve with a smaller inside diameter. There is a significant consequence of this repair approach. Reducing the shaft diameter near the lower end reduces the existing length of the taper fit engagement between the shaft and the impeller which is already marginal in several pump models. This could lead to excessive stresses on the key, fretting wear of the mating surfaces and result in loosening of the fit and excessive vibrations. There is, therefore, a limit to the depth of cracks that can be repaired by this current method. This limit is about 0.06 inches. Furthermore, the continued use of stainless steel material for the thermal sleeve does not address the problem of gaps opening between the shaft and sleeve under operating conditions.

There is a need therefore for an improved method of repairing cracks in reactor coolant pump shafts and labyrinths and for reactor coolant pumps repaired by such a method.

SUMMARY OF THE INVENTION

This need and others are satisfied by the invention which is directed to a method of repairing cracks in a reactor coolant pump shaft adjacent to a tapered end of the shaft on which an impeller is seated which comprises machining a circumferential groove in the pump shaft adjacent the tapered end to a depth and over an axial length to remove the cracks. The circumferential groove however does not extend into the tapered end of the shaft and therefore does not comprise the tapered fit of the impeller on the shaft. A split ring is installed in the circumferential groove. The split ring is sized to fill the groove so that the outer diameter of the split ring is flush with the outer diameter of the shaft. A thermal sleeve is then fit over the split ring. Preferably the thermal sleeve is shrink fit over the split ring and more preferably, has a coefficient of thermal expansion which is less than that of the shaft and of the split ring. The use of a sleeve material with a smaller thermal expansion coefficient than stainless steel ensures that no gaps open between the sleeve and shaft under operating conditions. The split ring preferably has complementarily chamfered axially extending confronting edges which mate.

An annulus is formed between the thermal sleeve, and the shaft and split ring. Preferably this annulus is formed by spaced apart internal ribs integrally formed with the thermal sleeve. The annulus contains substantially stagnant reactor coolant water which is an excellent insulator. Preferably, the annulus communicates with the pump chamber sufficiently that the pressure in the annulus equalizes with the pressure in the pump chamber yet the reactor coolant in the annulus remains substantially stagnant.

A washer between the retainer nut threaded onto a stud on the tapered end of the shaft which retains the impeller in place on the tapered end, extends radially outward to overlap the interface between the impeller and the tapered end of the shaft. This reduces flow of hot reactor coolant in the pressure chamber through this interface and especially around the key which locks the impeller to the shaft.

The invention also embraces a reactor coolant pump which has been repaired in accordance with the method.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
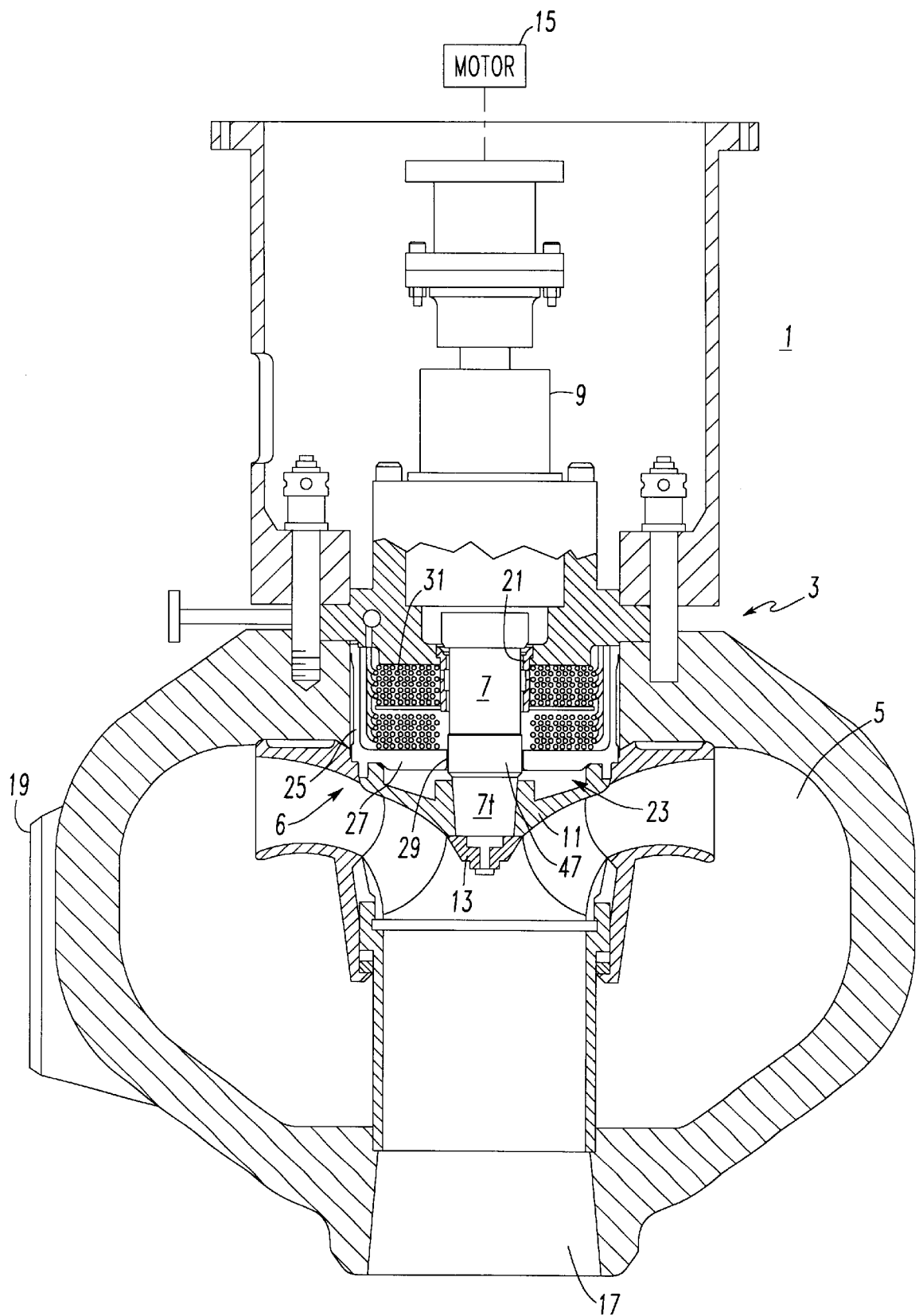
FIG. 1 is a longitudinal sectional view through a reactor coolant pump to which the invention is applied.

Referring to FIG. 1, the reactor coolant pump 1 includes a pump housing 3 forming a pump chamber 5. A pump shaft 7 supported by bearings 9 mounted in the housing 3 extends into the pump chamber 5 and forms part of drive assembly 6 which further includes an impeller 11 secured to a tapered end 7t of the pump shaft 7 in the pump chamber 5 by a retaining nut 13. The pump shaft 7 is rotated by a motor shown schematically at 15 to drive the impeller 11 which draws reactor coolant in through an inlet 17 and discharges it through an outlet 19. Seals 21 bear against the shaft 7 below the bearings 9.

As previously discussed, the reactor coolant water in the pump chamber 5 is at a temperature of about 550° F. and a pressure of about 2250 psi. In order to protect the seals 21 and the bearings 9 from these harsh conditions, a thermal barrier 23 is provided. The thermal barrier 23 includes a generally cylindrical cover 25 having an end wall 27 with a central opening 29 through which the pump shaft 7 extends. Cooling water is injected inside the cover 25 and passes outward through the opening 29 into the pump chamber 5. A secondary means of cooling is provided by a stack of pancake cooling coils 31 inside the cover 25. A separate source of cooling water is circulated through these cooling coils.

Figure 2:
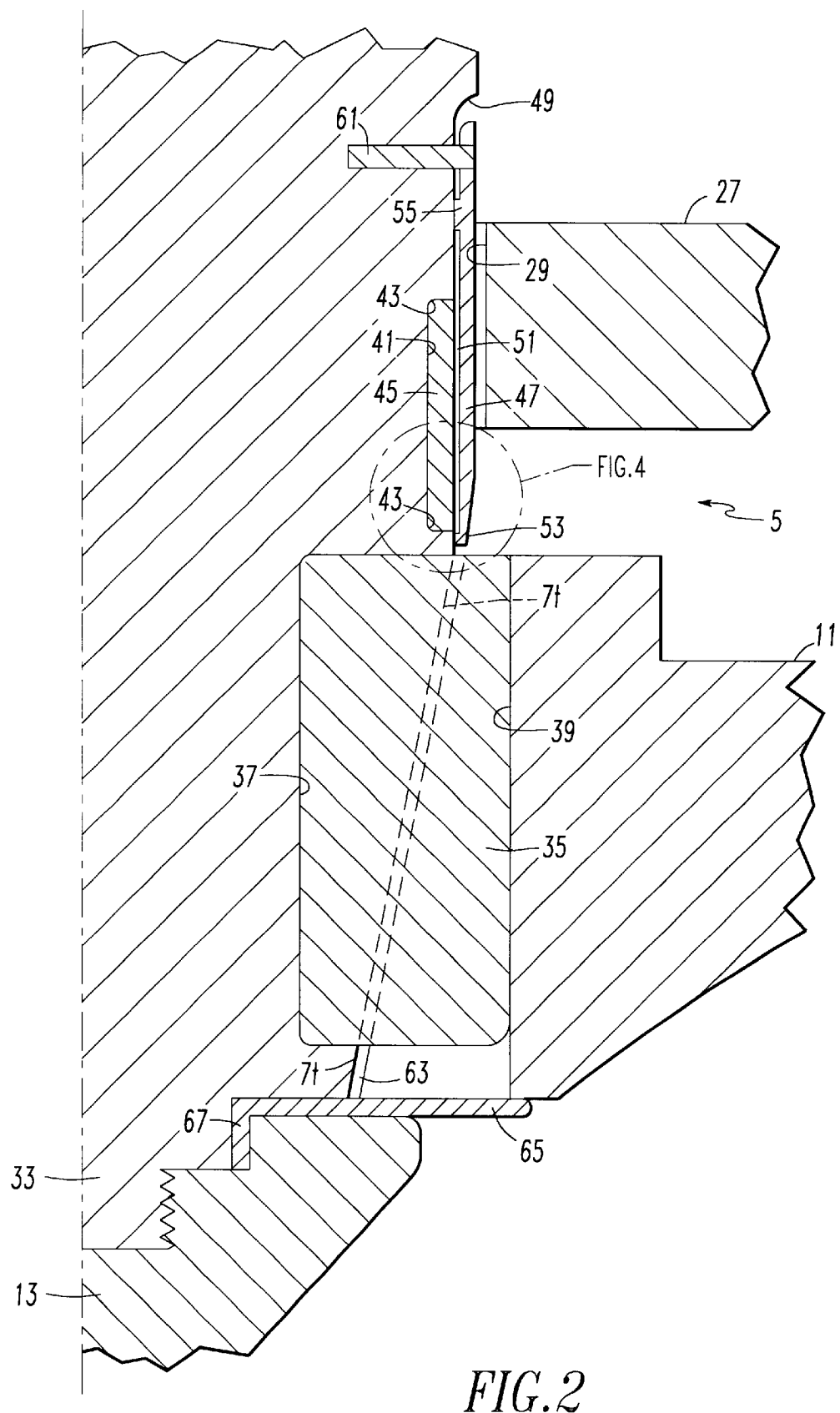
FIG. 2 is an enlargement of a portion of FIG. 1 illustrating details of the pump shaft and the mounting of the impeller on the pump shaft.

The enlarged view of FIG. 2 shows more of the details of the pump shaft 7 and its connection to the impeller 11. As can be seen, the impeller 11 slides onto the tapered end 7t of the pump shaft 7. The retaining nut 13 screws onto a threaded stud 33 on the end of the pump shaft. The impeller is locked to the pump shaft 7 for rotation therewith by a key 35 which engages key ways 37 and 39 in the tapered end 7t of the pump shaft and the impeller 11, respectively. As discussed, cooling water injected inside the cover passes through the opening 29 in the end wall 27 of the cover and is discharged into the pump chamber 5 above the impeller 11. The mixing of the cooling water and the hot reactor coolant in this area tends to impart cyclic thermal stresses to the adjacent portion of the shaft 7. As noted above, cracks up to a depth of 0.2 inches have been observed. Such cracks have developed even though it is common practice to provide a thermal sleeve on the pump shaft 7 where it passes through the end wall 27 of the cover.

The invention is directed to repairing cracks in this area. Prior repair procedures have included turning the shaft on a lathe to a depth which removes the cracks. A smaller thermal sleeve is then fitted onto the reduced diameter shaft. As can be appreciated from FIG. 2, turning down the shaft reduces the length of the tapered section 7t thereby reducing the contact surface with the impeller. This is undesirable, and therefore has been a limitation on the depth of cracks that can be removed by this prior art technique.

Figure 3:
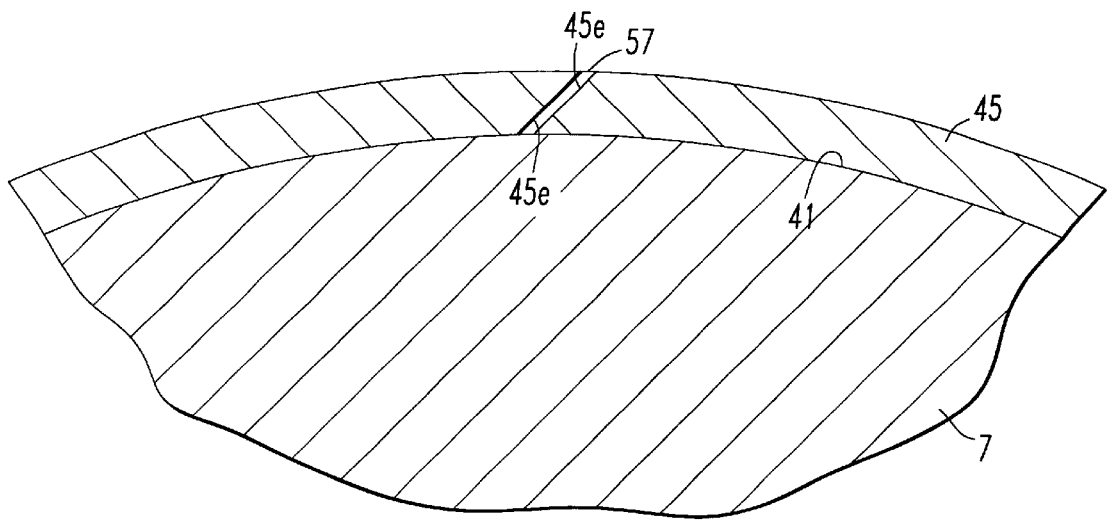
FIG. 3 is a fragmentary cross sectional view taken along the line 3—3 in FIG. 4.

The present invention repairs cracks in the pump shaft 7 adjacent the opening 29 in the cover 27 without reducing the length of the tapered end 7t of the pump shaft. This is accomplished by machining a groove 41 into the shaft 7 to a depth and axial length necessary to remove the crack or cracks. This groove 41 is machined on the full diameter section of the shaft 7 above the tapered end 7t. The corners of the groove 41 are rounded at 43 to reduce the stress concentrations. A split ring 45 is installed in this circumferential groove 41. The split ring 45 is sized to fill the circumferential groove so that the outer diameter of the split ring is flush with the outer diameter of the pump shaft 7. The split ring 45 can be a ring with a single cut which allows the ring to be expanded to slide over the shaft 7 from the tapered end and drop into the circumferential groove 41. Preferably, confronting chamfered ends 45e are provided on the split ring to provide a snug fit in the circumferential groove 41 as illustrated in FIG. 3. Alternatively, a two piece split ring could be used, again preferably with confronting chamfered ends.

Figure 4:
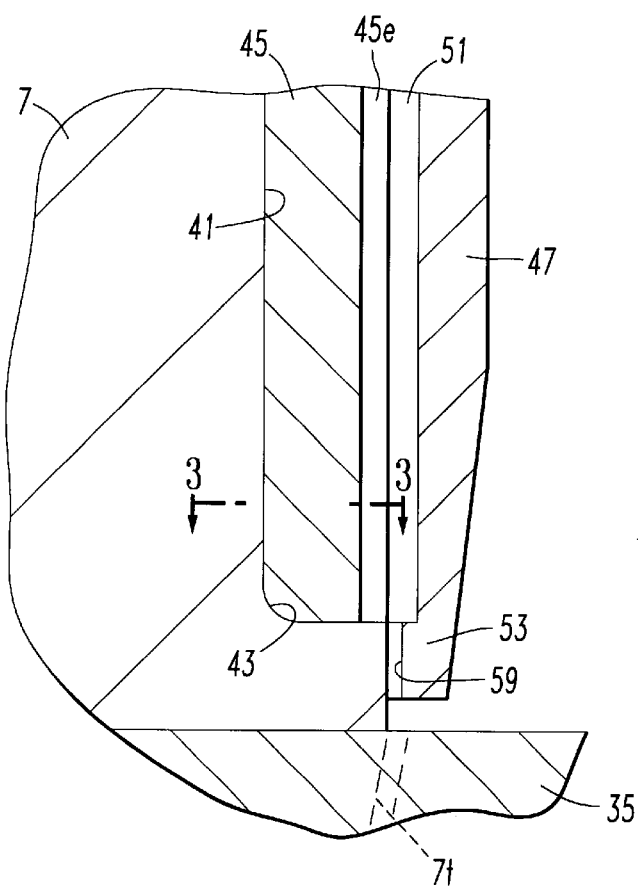
FIG. 4 is an enlargement of a section of FIG. 2 with part cut away for illustration.

With the split ring 45 in place in the circumferential groove 41, a thermal sleeve 47 is installed over the split ring 45 and extends upward over a portion of the shaft 7 below a shoulder 49. As best seen in FIG. 4, a radially thin annulus 51 is formed between the thermal sleeve 47, and the split ring and the shaft 7 above the split ring. This annulus 51 is formed by two circumferential ribs 53 and 55 (see FIG. 2 also) formed on the inner surface of the thermal sleeve. These ribs have a radial dimension of about 0.030 inches (about 0.762 mm) to about 0.050 inches (about 1.27 mm) and preferably about 0.040 inches (1.016 mm). The axial length of the ribs 53 and 55 is not critical but in the exemplary sleeve are about 0.375 inches long (about 9.525 mm).

The sleeve is shrink fit over the split ring 45 and pump shaft 7 with a few thousands, about 0.010 to 0.020 inch and preferably 0.015 inches. As is known, the sleeve 47 is heated to a high temperature such as about 900° F., installed in place over the split ring and pump shaft and then allowed to cool. To provide a fit which does not deteriorate during operation of the pump, the thermal sleeve 47 is fabricated from material having a lower coefficient of thermal expansion than that of the split ring and the pump shaft. In the exemplary pump, the thermal sleeve 47 is made from Alloy 625 which has a thermal expansion of about 7.1 in/in/° F. while the shaft 7 and split ring 45 are made of stainless steel which has a thermal expansion of about 9.6 in/in/° F.

The annulus 51 communicates with the pump chamber 5, so that a thin layer of reactor coolant which is a good thermal insulator blankets the split ring and the portion of the pump shaft 7 encircled by the annulus. A small passage 59 through the rib 53 (or radially though the sleeve 47, not shown) provides the communication for the annulus 51 with the pump chamber 5. The passage should be adequate to equalize the pressure in the annulus 51 with the pressure in the pump chamber 5 while maintaining a substantially stagnant layer of reactor coolant in the annulus 51. The sleeve is further fixed on the shaft 7 by a pair of diametrically opposed pins 61 (see FIG. 2, only one shown) which are shrink fit into place. An alternative method of securing the sleeve from rotation is by having an extension of the key engage with a slot in the lower end of the sleeve.

As can be appreciated from FIG. 2, the reactor coolant pumped by the impeller can work down along the interface 63 between the tapered end 7t of the pump shaft and the impeller 11 around the key 35. The rotation of the pump shaft causes this bypass flow path to rotate, inducing flow oscillations in the gap between the sleeve and shaft, and between the sleeve and labyrinth. As this coolant is hot, it can impose heat stress on this section of the shaft 7 and in the labyrinth which is undesirable. Therefore, as another aspect of the invention, an oversized washer 65 is placed over the threaded stud 33 on the end of the shaft 7 so that it radially spans the interface gap 63 and the open lower end of the keyway 39 in the impeller 11 and is clamped against the bottom of the impeller to block flow through this interface gap 63 when the retaining nut 13 is tightened down on a threaded shaft 33. A flange 67 on the washer 65 extends axially inside the retaining nut 13 for additional sealing.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of repairing cracks in a pump shaft adjacent a tapered end on which an impeller is seated in a pump chamber; said method comprising the steps of:

machining a circumferential groove in said pump shaft adjacent said tapered end to a depth and over an axial length to remove said cracks but not extending into said tapered end;

installing a split ring in said circumferential groove sized to fill said circumferential groove so that an outer diameter of said split ring is flush with an outer diameter of said pump shaft; and fitting a thermal sleeve over said split ring.

2. The method of claim 1 wherein said step of machining said circumferential groove includes rounding corners of said circumferential groove.

3. The method of claim 1 wherein said step of installing said split ring comprises first providing said split ring with complementarily chamfered confronting axially extending edges.

4. The method of claim 1 wherein said step of fitting said thermal sleeve comprises shrink fitting said thermal sleeve over said split ring.

5. The method of claim 4 wherein said thermal sleeve has a coefficient of thermal expansion which is less than that of said pump shaft and that of said split ring.

6. The method of claim 4 wherein said step of fitting said thermal sleeve includes forming an annulus containing reactor coolant between said thermal sleeve, and said pump shaft and split ring.

7. The method of claim 6 wherein said step of forming said annulus comprises providing said thermal sleeve with axially spaced internal annular ribs.

8. The method of claim 6 wherein said step of forming said annulus includes providing communication between said annulus and reactor coolant being pumped in said pump chamber, said communication being sufficient to equalize pressure of said reactor coolant in said annulus with pressure in said pump chamber while maintaining reactor coolant in said annulus substantially stagnant.

9. The method of claim 1 further including installing an impeller on said tapered end of said pump shaft by threading a retainer nut onto a threaded stud on said tapered end of said pump shaft with a washer between said retainer nut and said impeller, said washer radially overlapping an interface between said tapered end of said shaft and said impeller.

10. A repaired reactor coolant pump comprising:

a housing defining a pump chamber;

a motor supported by said housing; and a drive assembly comprising a shaft mounted in the housing and having one end coupled to said motor and an opposite tapered end extending into said pump chamber, said shaft having a circumferential groove formed by machining out surface cracks and adjacent but not extending into said tapered end, a split ring seated in and filling said circumferential groove, a thermal sleeve shrink fit over said split ring, and an impeller mounted on said tapered end of said shaft.

11. The repaired reactor coolant pump of claim 10 wherein said split ring has complementarily chamfered, axially extending, confronting edges which mate.

12. The repaired reactor coolant pump of claim 10 wherein said thermal sleeve has a coefficient of thermal expansion less than that of said shaft and of said split ring.

13. The repaired reactor coolant pump of claim 10 wherein said driven assembly includes at least a pair of annular spacers between said thermal sleeve and said shaft spaced axially to form an annulus inwardly of said thermal sleeve, said annulus containing substantially stagnant reactor coolant.

14. The repaired reactor coolant pump of claim 13 wherein said at least a pair of annular spacers comprise at least a pair of internal ribs integrally formed on said thermal sleeve.

15. The repaired reactor coolant pump of claim 14 wherein said pair of internal ribs are not more than about 0.050 inches (about 1.27 mm) in radial dimension.

16. The repaired reactor coolant pump of claim 15 wherein radial ribs have a radial thickness of between about 0.030 inches (about 0.762 mm) and about 0.050 inches (about 1.27 mm) in radial dimension.

17. The repaired reactor coolant pump of claim 14 wherein said annulus communicates with said pump chamber sufficiently to equalize pressure in said annulus with pressure in said pump chamber while said reactor coolant in said annulus remains substantially stagnant.

18. The repaired reactor coolant pump of claim 17 wherein one of said internal ribs on said thermal sleeve has a passage through which said annulus communicates with said pump chamber.

19. The repaired reactor coolant pump of claim 10 wherein said impeller is retained on said tapered end of said shaft by a retainer nut and is locked for rotation with said shaft by a key 35 seated in keyways in said tapered end and said impeller, said driven assembly further including a washer spanning an interface between said tapered end of said shaft and said impeller and retained in place by said retainer nut.

* * * * *